(No Model.)
W. Y. WEST.
BACK POLE, &c.
No. 406,014. Patented June 25, 1889.
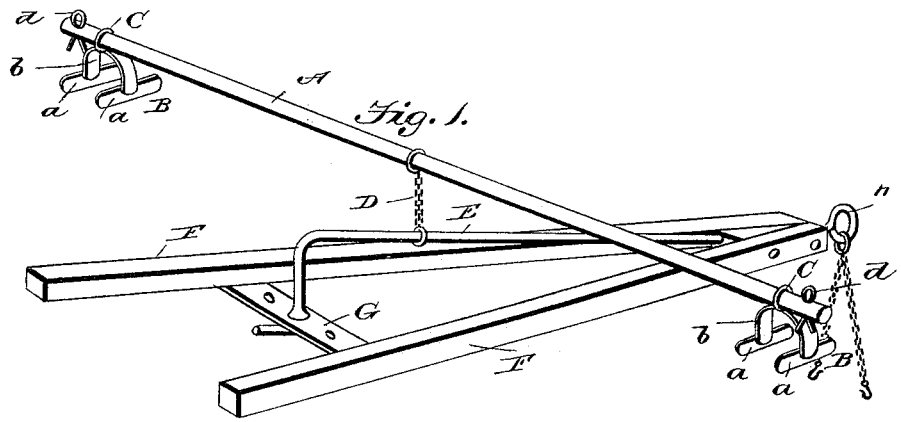
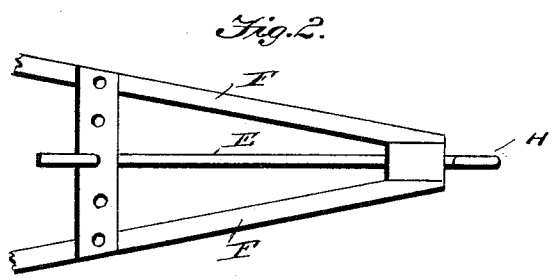
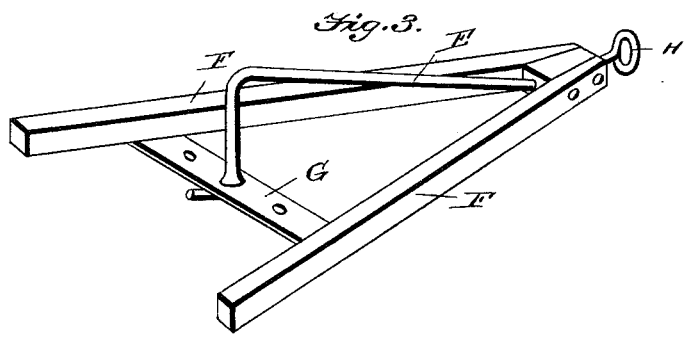
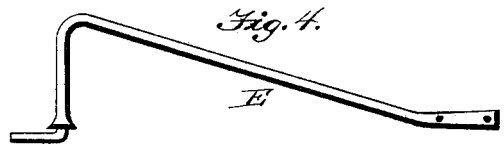
WITNESSES
INVENTOR
Wm. Yeamons West.
By W. R. Stringfellow.
Attorney.

UNITED STATES PATENT OFFICE.

WILLIAM YEOMANS WEST, OF NEW ORLEANS, LOUISIANA, ASSIGNOR TO THE A. BALDWIN CO., (LIMITED,) OF SAME PLACE.

BACK-POLE, &c.

SPECIFICATION forming part of Letters Patent No. 406,014, dated June 25, 1889.

Application filed January 8, 1889. Serial No. 295,815. (No model.)

*To all whom it may concern:*

Be it known that I, WILLIAM YEOMANS WEST, a citizen of the United States, residing at New Orleans, in the parish of Orleans and State of Louisiana, have invented certain new and useful Improvements in Back-Poles for Agricultural Implements; and I do declare the following to be a full, clear, and exact description of the invention, such as will enable others skilled in the art to which it appertains to make and use the same.

This invention relates to draft-beam or back-pole attachments for agricultural implements—such as harvesters and the like; and it has for its object to provide means whereby the weight may be equalized upon the backs of the draft-animals, and consequently removed from the neck as heretofore.

The invention will be fully understood from the following description and claims, when taken in connection with the accompanying drawings, in which—

Figure 1 is a perspective view of my improvements, showing the same attached to a portion of a double beam, such as that of a harvester. Fig. 2 is an inverted plan view of the double beam with parts broken away. Fig. 3 is a perspective view of the same, and Fig. 4 is a perspective view of the center rod for the attachment of the cross-bar or saddle-bar.

Referring by letter to the said drawings, A indicates a transverse bar, which I shall denominate the "saddle-bar." This bar A may be circular in transverse section and of any suitable length, it being sufficiently long to reach from above the back of one draft-animal to a similar point above the back of the other animal on the opposite side of the draft beam or frame.

B B indicate saddles, which are similar in construction and attached one near each end of the bar A. These saddles may be of any ordinary or approved construction, the ones here illustrated being composed of side plates *a* and a connecting bridge or bow *b*. The bridges *b* of these saddles are provided on their upper sides about midway of their length with a swivel C. I speak of a swivel for connecting the saddles with the bar A for the reason that such is the preferred means for connecting, although it is obvious that a rigid eye or a like means may be employed for the purpose.

The saddles are prevented from leaving the bar A by stop devices at opposite ends thereof, the ones here shown being cotter-pins *d*, passed through eyes in opposite ends of the said bar.

The double tongue or frame is here illustrated as composed of two bars or beams F, which converge forwardly, at which point they are provided with a clevis H, and are braced at a suitable point of their length by a cross-beam G. This construction, however, may be varied without departing from the spirit of the invention.

E indicates a longitudinal rod or bar. This rod is preferably of an angular form and so arranged with relation to the tongue or draft-frame as to pitch slightly forward, being secured at its forward end to the forward end of said tongue or frame and its opposite end secured to the cross-brace G.

The longitudinal bar or rod E may have its inner branch *e* provided with a reduced and rearwardly-bent portion *f*, to enter an eye in said cross-bar G, and thereby dispense with other and expensive means of securing.

The saddle-bar A is connected with the longitudinal bar E, so that the former may be allowed a universal play, and the means here illustrated consist of a chain D, one link of which is slipped over the bar or rod E and the opposite link or end slipped over the bar or rod A. It is obvious that such a construction can be rendered adjustable according to the height of the draft-animal employed.

By a device of this character I am enabled to bring the weight of the draft-frame upon the backs of the draft-animals, and I am also enabled to attain an easy and ready adjustment of all of the parts.

Having described my invention, what I claim is—

1. The combination, with a draft beam or frame of an agricultural implement, of a transverse bar connected therewith and carrying at opposite ends saddles adapted to be applied to the backs of draft-animals, substantially as specified.

2. The combination, with a draft beam or frame, of a bar or rod secured thereto and having a pitch forwardly, and a transverse bar connected with said frame-bar and carrying saddles to be applied to the backs of draft-animals, substantially as specified.

3. The combination, with the draft-frame of an agricultural machine, of a transverse bar connected therewith and saddles connected to the opposite ends of said bar by swivel-joints, substantially as specified.

4. The combination, with a draft-frame, of the bar E, the saddle-bar A, the chain D, connecting them, and the saddles B, connected to said bar A on opposite sides of the draft-frame, substantially as specified.

In testimony whereof I affix my signature in presence of two witnesses.

WILLIAM YEOMANS WEST.

Witnesses:
HENRY J. RHODES,
PERCY D. PARKS.